US008478991B2

(12) United States Patent
Hamachi

(10) Patent No.: US 8,478,991 B2
(45) Date of Patent: Jul. 2, 2013

(54) MANAGEMENT APPARATUS FOR MANAGING WIRELESS PARAMETER, CONTROL METHOD FOR THE MANAGEMENT APPARATUS, AND COMPUTER PROGRAM FOR INSTRUCTING COMPUTER TO EXECUTE THE CONTROL METHOD

(75) Inventor: Toshifumi Hamachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1042 days.

(21) Appl. No.: 11/951,799

(22) Filed: Dec. 6, 2007

(65) Prior Publication Data
US 2008/0155667 A1    Jun. 26, 2008

(30) Foreign Application Priority Data

Dec. 20, 2006  (JP) .................................. 2006-343054
Oct. 12, 2007  (JP) .................................. 2007-266606

(51) Int. Cl.
*H04L 29/06*          (2006.01)
(52) U.S. Cl.
USPC ...................................................... 713/156

(58) Field of Classification Search
USPC ................ 726/2, 5, 10, 6; 713/155–158, 176, 713/178
See application file for complete search history.

(56) References Cited

U.S. PATENT DOCUMENTS

| 5,453,601 | A  | * | 9/1995 | Rosen ............................. 705/65 |
| 7,471,662 | B2 | * | 12/2008 | Otsuka .......................... 370/338 |
| 7,716,478 | B2 | * | 5/2010 | Viot et al. ...................... 713/170 |
| 2002/0069361 | A1 | * | 6/2002 | Watanabe et al. ............. 713/185 |
| 2005/0054329 | A1 |  | 3/2005 | Kokudo |
| 2005/0272371 | A1 | * | 12/2005 | Komatsuzaki et al. ...... 455/41.2 |

FOREIGN PATENT DOCUMENTS

| JP | 2004-07351 A | 1/2004 |
| JP | 2004-013718 A | 1/2004 |
| JP | 2004-78426 A | 3/2004 |
| JP | 2004-128886 A | 4/2004 |
| JP | 2004-289461 A | 10/2004 |
| JP | 2005-86583 A | 3/2005 |

* cited by examiner

*Primary Examiner* — Beemnet Dada
(74) *Attorney, Agent, or Firm* — Canon U.S.A., Inc. IP Division

(57) ABSTRACT

A management apparatus for managing a wireless parameter is configured to obtain a certificate from a certificate authority by using a timing related to a setting processing based on a wireless parameter setting method as a trigger and send the obtained certificate to a wireless communication apparatus as well as the wireless parameter.

22 Claims, 9 Drawing Sheets

MANAGEMENT APPARATUS FOR MANAGING WIRELESS PARAMETER, CONTROL METHOD FOR THE MANAGEMENT APPARATUS, AND COMPUTER PROGRAM FOR INSTRUCTING COMPUTER TO EXECUTE THE CONTROL METHOD

BACKGROUND OF THE INVENTION

1. Field of the Invention

The present invention relates to a management apparatus for managing a wireless parameter, a control method for the management apparatus, and a computer program for instructing a computer to execute the control method.

2. Description of the Related Art

In a case where a communication is performed by using an IEEE 802.11 wireless LAN, it is necessary to set parameters for a wireless communication such as a communication channel, a network identifier (SSID), an encryption method, an encryption key, an authentication method, and an authentication key (hereinafter referred to as wireless parameter) in an apparatus. In general, such wireless parameters are set by using a user interface of the apparatus. However, this setting is a troublesome operation. In particular, inputting of a character string such as an encryption key or a network identifier is not easy in apparatuses other than a personal computer (hereinafter referred to as PC), for example, a digital camera and a printer.

In view of the above-described circumstance, a technique for easily setting wireless parameters in a wireless LAN apparatus has been proposed (refer to Japanese Patent Laid-Open No. 2004-013718 and US2005/272371 (corresponding Japanese Patent Laid-Open No. 2004-7351)).

Also, a system for connecting a management apparatus for managing wireless parameters provided to a wireless communication apparatus, to an access point via a network has been proposed (refer to US2005/054329 (corresponding Japanese Patent Laid-Open No. 2005-86583)).

In recent years, a public wireless LAN service has been available. In a case where the public wireless LAN is utilized, when a wireless communication apparatus is connected to a network via an access point (AP), it is necessary to perform a user authentication. As an example method for the user authentication, a method of utilizing an electronic certificate (hereinafter referred to as certificate) issued from a certificate authority (CA) has been proposed (refer to Japanese Patent Laid-Open No. 2004-78426, Japanese Patent Laid-Open No. 2004-128886).

In order that a wireless communication apparatus receives the user authentication by way of the certificate, it is necessary to obtain the certificate issued from the certificate authority.

Herein, in a case where a temporary access to the network is permitted in the public wireless LAN such as a one-day limited service, an expiration date is set in the certificate. For example, in a case where the expiration date is set as "one day from the issuance of the certificate", when the certificate is obtained by the wireless communication apparatus after a long period of time since the certificate has been issued, a period of time during which the wireless communication apparatus can receive the user authentication becomes shorter than one day.

SUMMARY OF THE INVENTION

An embodiment of the present invention has been made in view of the above-described problems and the invention addresses the problems generated when a communication apparatus obtains a certificate issued from a certificate authority.

According to an aspect of the present invention, there is provided a management apparatus for managing a wireless parameter provided to a wireless communication apparatus based on a wireless communication setting method, the management apparatus including: a connection unit configured to establish a connection via a network to a certificate authority which issues a certificate for performing an authentication of the communication apparatus; an obtaining unit configured to obtain the certificate from the certificate authority by using a timing related to a setting processing based on the wireless parameter setting method as a trigger; and a provision unit configured to also provide the certificate obtained by the obtaining unit to the wireless communication apparatus when the wireless parameter is provided to the wireless communication apparatus based on the wireless communication setting method.

Further features of the present invention will become apparent from the following description of exemplary embodiments with reference to the attached drawings.

DESCRIPTION OF THE EMBODIMENTS

Exemplary embodiments of the present invention will be described in detail in accordance with the drawings.

Figure 1:
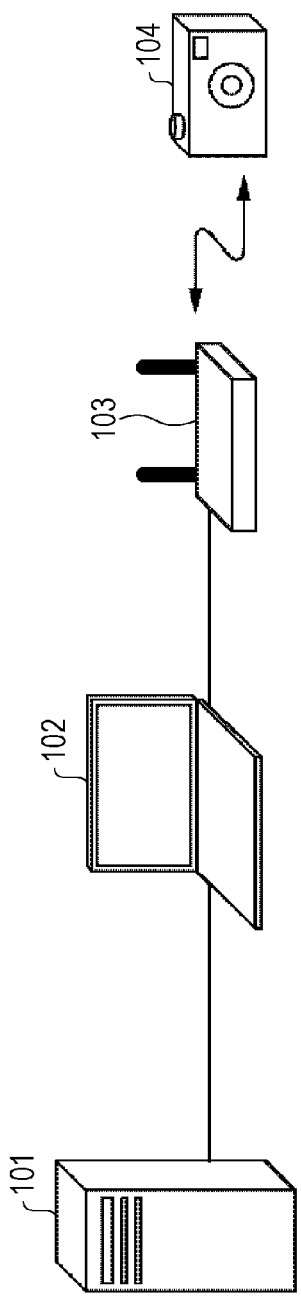
FIG. 1 is a system configuration diagram according to the present invention.

FIG. 1 illustrates a system configuration according to a first exemplary embodiment of the present embodiment.

A certificate authority (CA) 101 is adapted to issue an electronic certificate (hereinafter referred to as certificate). An expiration date can be set in the certificate.

A wireless parameter management apparatus (hereinafter referred to as management apparatus) 102 is adapted to perform management of the wireless parameter in the IEEE 802.11 wireless LAN and provision of the wireless parameter to a wireless communication apparatus. Examples of the wireless parameter managed by the management apparatus 102 include a communication channel, a network identifier (SSID), an encryption method, an encryption key, an authentication method, and an authentication key. Also, the IEEE 802.11 wireless LAN has a variety of standards such as 802.11a, 802.11b, and 802.11g. Thus, it is also possible to manage information regarding which standard is used from among the above-described standards as the wireless parameter. Herein, the management apparatus is used by installing dedicated software into a PC.

In addition, the management apparatus 102 includes the function of a RADIUS (Remote Authentication Dial-In User Service) server. Furthermore, the management apparatus 102 can also obtain the certificate for a client issued from the certificate authority 101 and provide the obtained certificate for a client to the wireless communication apparatus. The certificate for the client issued by the certificate authority 101 is a certificate used for the server to uniquely identify the client for performing an authentication whether the wireless communication apparatus is a valid terminal.

An access point (hereinafter referred to as AP) 103 includes an interface function for enabling communication between a wireless network and a wired network, a control function for wireless signals, an encryption function for wireless data which is sent and received.

A digital still camera (hereinafter referred to as DSC) 104 includes a wireless communication function based on the IEEE 802.11 wireless LAN.

The certificate authority 101, the management apparatus 102, and the AP 103 are connected via a wired LAN. Although not illustrated, other apparatuses may be connected to the wired LAN. In the wired LAN, an access management is performed through a user authentication by using the above-described RADIUS server. For the user authentication, a certificate for a client which is issued from the certificate authority 101 is used. The RADIUS server is configured to perform an authentication whether the wireless communication apparatus is a valid terminal based on the certificate for the client sent from the wireless communication apparatus. Therefore, in order that the DSC 104 accesses the wired LAN via the AP 103, it is necessary to obtain the certificate for the client issued from the certificate authority 101.

The management apparatus 102, the AP 103, and the DSC 104 are provided with a function to automatically set the wireless parameter (hereinafter referred to as wireless parameter setting method). The wireless parameter setting method refers to a method of automatically setting the wireless parameter based on the procedure previously determined between the connected apparatuses and the message. Regarding the wireless parameter automatic setting method, each manufacturer adopts its own method in many cases. Therefore, apparatuses which do not correspond to a common wireless parameter setting method cannot use an automatic setting method to set the wireless parameter because the procedures for setting the wireless parameter setting are different from each other or readable messages are different from each other.

On the other hand, apparatuses which correspond to a common wireless parameter setting method can easily set the wireless parameter by using the relevant automatic setting method. By executing the wireless parameter setting method, it is possible to transfer the wireless parameter managed by the management apparatus 102 via the AP 103 to the DSC 104. Also, the management apparatus 102 can also obtain the certificate issued from the certificate authority 101 and send the certificate for the client together with wireless parameter to the DSC 104. As described above, the certificate for the client is a certificate declaring that the wireless communication apparatus is a valid terminal and it is noted that the certificate for the client is not a certificate declaring that the wireless parameter is a valid parameter.

If an operation in which the management apparatus 102 obtains the certificate from the certificate authority 101 and an operation in which the management apparatus 102 sends the wireless parameter to the DSC 104 based on the wireless parameter setting method are independently performed, various problems may be generated.

For example, in a case where the management apparatus obtains the certificate in advance regardless of the presence or absence of the provision of the wireless parameter, even when it is unnecessary to send the certificate to the DSC 104, the management apparatus holds the certificate. Therefore, there is a possibility that the certificate for the client may be stolen by way of an unauthorized access.

In addition, after the certificate is issued from the certificate authority 101, if it takes a long period of time for the management apparatus 102 to send the certificate for the client to the DSC 104, similarly to the above-described case, the management apparatus 102 holds the certificate for the client for a long period of time. Therefore, there is a problem in terms of security. Also, if an expiration date is set in the certificate, there is a possibility that a period of time during which the DSC 104 can receive the user authentication may be shortened.

In view of the above, according to the present embodiment, a description will be provided of a processing example for shortening a period of time from the obtaining of the certificate by the management apparatus 102 from the certificate authority 101 to the sending of the certificate to the DSC 104.

Figure 2:
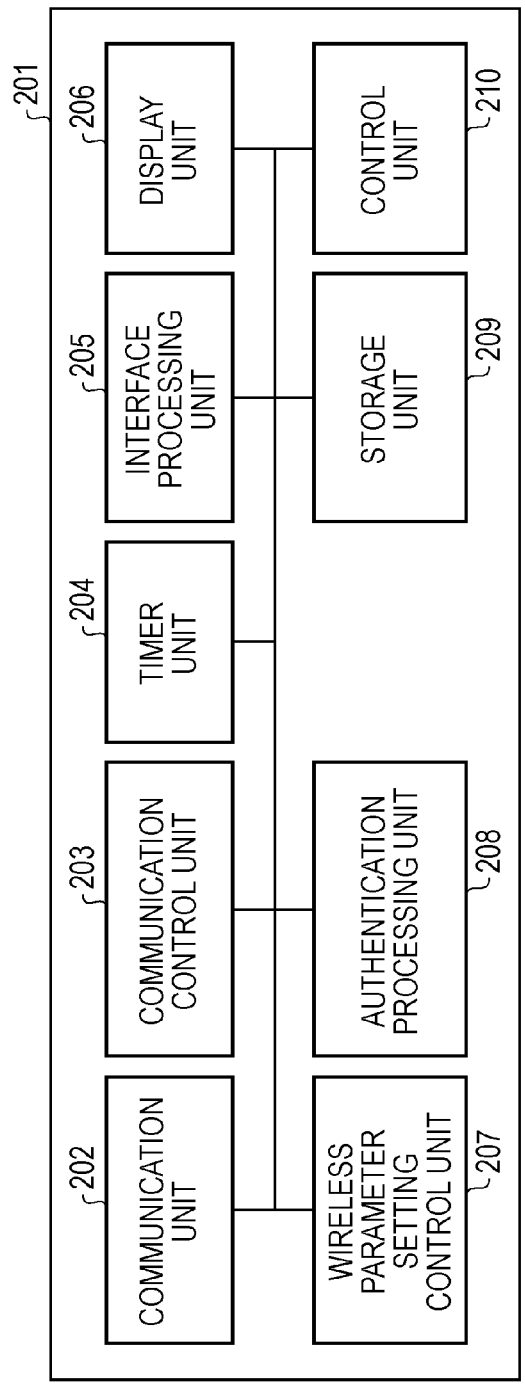
FIG. 2 is a block configuration diagram of a management apparatus according to the present invention.

FIG. 2 illustrates a block configuration of the management apparatus 102.

A communication unit 202 is adapted to perform wireless and wired communications with other apparatuses and a communication control unit 203 is adapted to control the communication unit 202. A timer unit 204 is adapted to active a timer and measure the timer. An interface processing unit 205 is adapted to perform various interface processings. A display unit 206 is adapted to perform various display operations. A wireless parameter setting control unit 207 is adapted to perform various controls related to the wireless parameter setting methods. An authentication processing unit 208 is adapted to perform a user authentication based on the Radius server. A storage unit 209 is adapted to store a wireless parameter used for a wireless communication with the AP 103, a password used for the wireless parameter setting method, a certificate obtained from the certificate authority 101, etc.. A control unit 210 is adapted to perform an operation control for the entire management apparatus 102.

Figure 5:
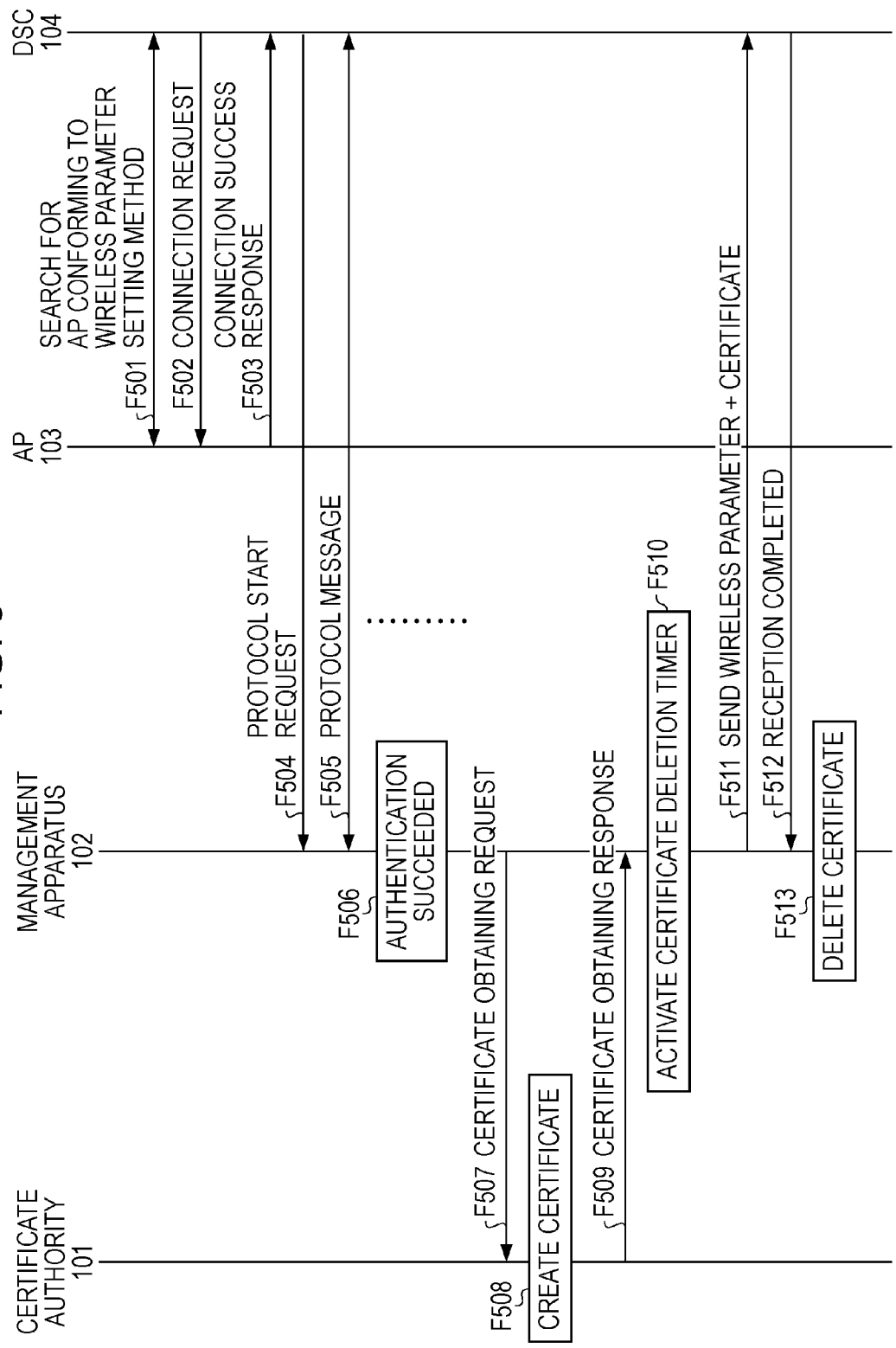
FIG. 5 is a sequence diagram according to the first exemplary embodiment of the present invention.

FIG. 5 illustrates a sequence of the respective apparatuses according to the present embodiment.

When the wireless parameter setting method of the DSC 104 is activated through an operation by the user, etc., the DSC 104 sends a search request to search for an AP conforming to the wireless parameter setting method (F501). When a search response to the search request is received from the AP 103 (F501), the DSC 104 sends a connection request to the AP 103 so that a temporary connection is established with the AP 103 (F502). When the connection request (F502) is sent, an SSID included in the search response (F501) from the AP 103 is used. When the DSC 104 receives a connection success response sent from the AP 103 (F503), the establishment of the temporary wireless connection between the AP 103 and the DSC 104 is completed.

After the establishment of the temporary wireless connection, even when the wireless parameter such as an encryption key is not set in the DSC 104, by using a packet prescribed by the wireless parameter setting method, the DSC 104 can communicate with the management apparatus 102 via the AP 103.

Next, the DSC 104 sends a start request of the wireless parameter setting processing based on the wireless parameter setting method (hereinafter referred to as wireless parameter setting protocol) via the AP 103 to the management apparatus 102 (F504). The management apparatus 102 which has received the start request of the wireless parameter setting protocol (F504) performs message sending and reception based on a procedure prescribed by the wireless parameter setting method with respect to the DSC 104 (F505). The message sent from the DSC 104 includes a password used for determining whether the provision of the wireless parameter to the DSC 104 may be performed. As the management apparatus 102 compares the password stored in the storage unit 210 with the password sent from the DSC 104, the authentication of the DSC 104 is performed (F506). The authentication in this case is to determine whether the wireless communication apparatus is an apparatus which may be provided with the wireless parameter.

When the authentication succeeds, the management apparatus 102 sends a certificate obtaining request to the certificate authority 101 (F507). When the certificate authority 101 receives the certificate obtaining request (F507), the certificate authority 101 creates a certificate (F508) and sends the certificate to the management apparatus 102 as a certificate obtaining response (F509).

The management apparatus 102 extracts a certificate for the client from the received certificate obtaining response (F509) and stores the certificates in the storage unit 210. Then, the management apparatus 102 activates a timer for a certificate deletion processing (F510) and sends the wireless parameter and the certificate for the client stored in the storage unit 210 to the DSC 104 (F511).

When the wireless parameter and the certificate for the client sent from the management apparatus 102 are received, the DSC 104 sends a reception completion message to the management apparatus 102 (F512). When the management apparatus 102 receives the reception completion message, the management apparatus 102 deletes the certificate for the client from the storage unit 210 (F513).

Through the above-described processing, by setting the wireless parameter sent from the management apparatus 102, the DSC 104 can perform a normal data communication with the AP 103. Also, by using the certificate for the client sent from the management apparatus 102, the DSC 104 can receive the authentication based on Radius server on the management apparatus 102 and it is possible to access the wired LAN via the AP 103.

Figure 3:
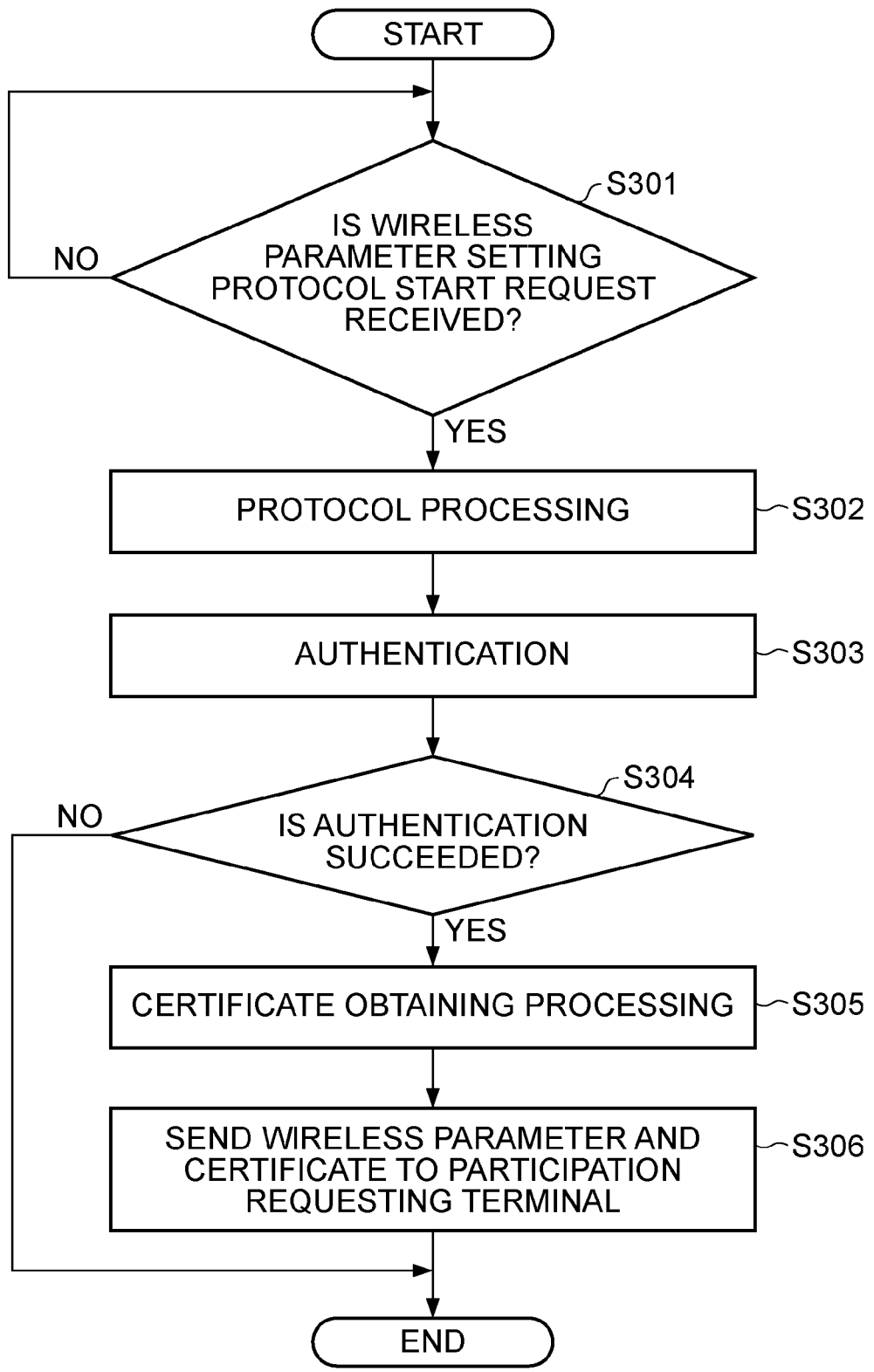
FIG. 3 is an operation flow of the management apparatus according to a first exemplary embodiment of the present invention.

FIG. 3 illustrates an operation flow of the management apparatus 102.

The management apparatus 102 stands by to receive the start request of the wireless parameter setting protocol sent from the wireless communication apparatus (the DSC 104 in the present embodiment) (S301). When the management apparatus 102 receives the start request of the wireless parameter setting protocol (Yes in S301), the management apparatus 102 performs the message sending and reception (the protocol processing) through the procedure prescribed by the wireless parameter setting method with the wireless communication apparatus that is the request sending source (S302).

Then, the management apparatus 102 compares the password stored in the storage unit 210 with the password obtained through the course of the protocol processing to perform the authentication for the above-described wireless communication apparatus (S303). In this case, the authentication determines whether the wireless communication apparatus is an apparatus which may be provided with the wireless parameter.

When the authentication succeeds (Yes in S304), the management apparatus 102 performs a certificate obtaining processing (S305). To be more specific, the obtaining of the certificate is requested from the management apparatus 102 to the certificate authority 101 and the certificate issued from the certificate authority 101 is obtained. Then, the management apparatus 102 stores the received certificate for the client in the storage unit 210.

When the certificate obtaining processing ends, the management apparatus 102 sends the wireless parameter and the certificate for the client stored in the storage unit 210 to the wireless communication apparatus (S306).

When the authentication fails (No in S304), the management apparatus 102 ends the processing.

Figure 4:
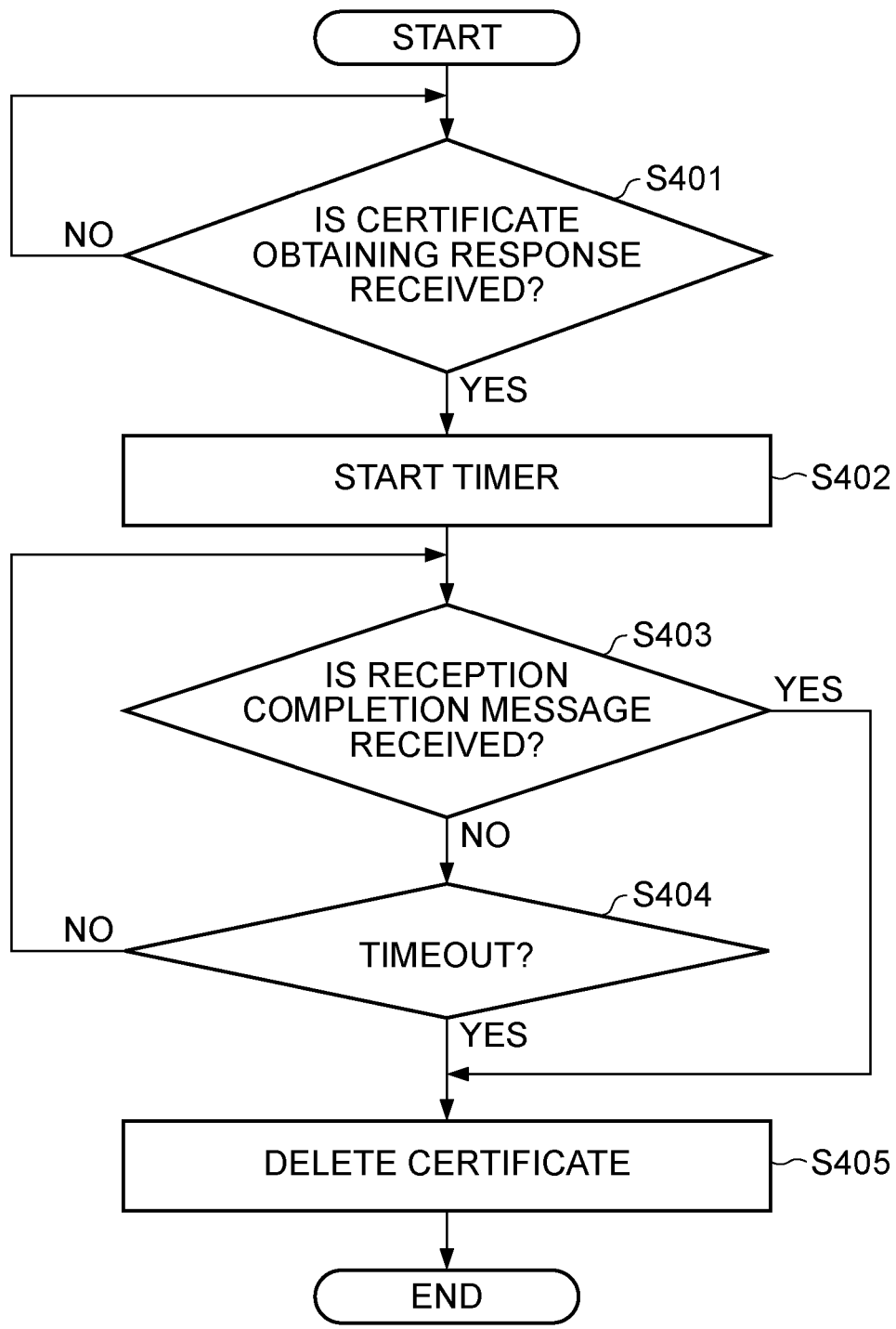
FIG. 4 is an operation flow in which the management apparatus deletes a certificate.

FIG. 4 illustrates an operation flow in which the management apparatus 102 deletes the certificate for the client.

In the certificate obtaining processing of FIG. 3 (S305), after the management apparatus 102 sends a certificate obtaining request to the certificate authority 101, the management apparatus 102 stands by to receive a certificate obtaining response sent from the certificate authority 101 (S401).

When the certificate obtaining response is received (Yes in S401), a timer for measuring a period of time until the certificate for the client is deleted (S402). After that, when a reception completion message is received from the wireless communication apparatus (Yes in S403) or when a timeout occurs in the timer (Yes in S404), the management apparatus 102 deletes the certificate for the client from the storage unit 210 (S405).

According to the present embodiment, as the timing related to the wireless parameter setting processing based on the wireless parameter setting method, the management apparatus 102 performs the certificate obtaining processing when the password authentication based on the wireless parameter setting method succeeds, and sends the obtained certificate for the client to the wireless communication apparatus together with the wireless parameter. In other words, the management apparatus 102 obtains the certificate when it is determined that the wireless parameter may be provided to the wireless communication apparatus, and it is thus possible to shorten the time period from the obtaining of the certificate to the sending of the certificate as compared with the case where the certificate is obtained in advance. Therefore, in a case where the expiration date is set in the certificate, a time lag from the certificate issuance from the certificate authority to the certificate obtaining by the wireless communication apparatus can be reduced.

Also, the certificate is not obtained when it is unnecessary to provide the certificate for the client to the wireless communication apparatus, and thus the unnecessary communication communications traffic can be reduced. It is also possible to decrease the load on the certificate authority and the management apparatus.

In addition, the management apparatus 102 does not hold the certificate when it is unnecessary to provide the certificate, and thus the possibility that the certificate is stolen by way of an unauthorized access is decreased. Also, as compared with the case where the management apparatus 102 obtains the certificate in advance, the period of time during which the management apparatus 102 holds the certificate can be shortened, and thus the possibility that the certificate is stolen by way of an unauthorized access is decreased. Moreover, as the management apparatus 102 deletes the stored certificate for the client when the reception completion message is received from the wireless communication apparatus, it is possible to further enhance the security. Also, as the certificate for the client is deleted when the timeout occurs in the certificate deletion timer, even if the reception completion message cannot be received, the certificate for the client is not held for longer than a certain period of time and it is possible to still further enhance the security.

In the above-described wireless parameter setting method, in a case where a timeout time is previously set, even if the setting of the wireless parameter is not completed, the wireless parameter setting processing ends upon the timeout. Therefore, in a case where the certificate is obtained when the password authentication based on the wireless parameter setting method succeeds similarly to the first exemplary embodiment, if the certificate obtaining processing takes a long period of time, there is a possibility that the wireless parameter setting processing may be timed out before the certificate is obtained.

According to a second exemplary embodiment of the present invention, another method related to the timing for the management apparatus 102 to perform the certificate obtaining processing will be described. The system configuration and the block configuration of the management apparatus 102 are similar to those of the first exemplary embodiment (FIGS. 1 and 2), and a description thereof will be omitted.

Figure 7:
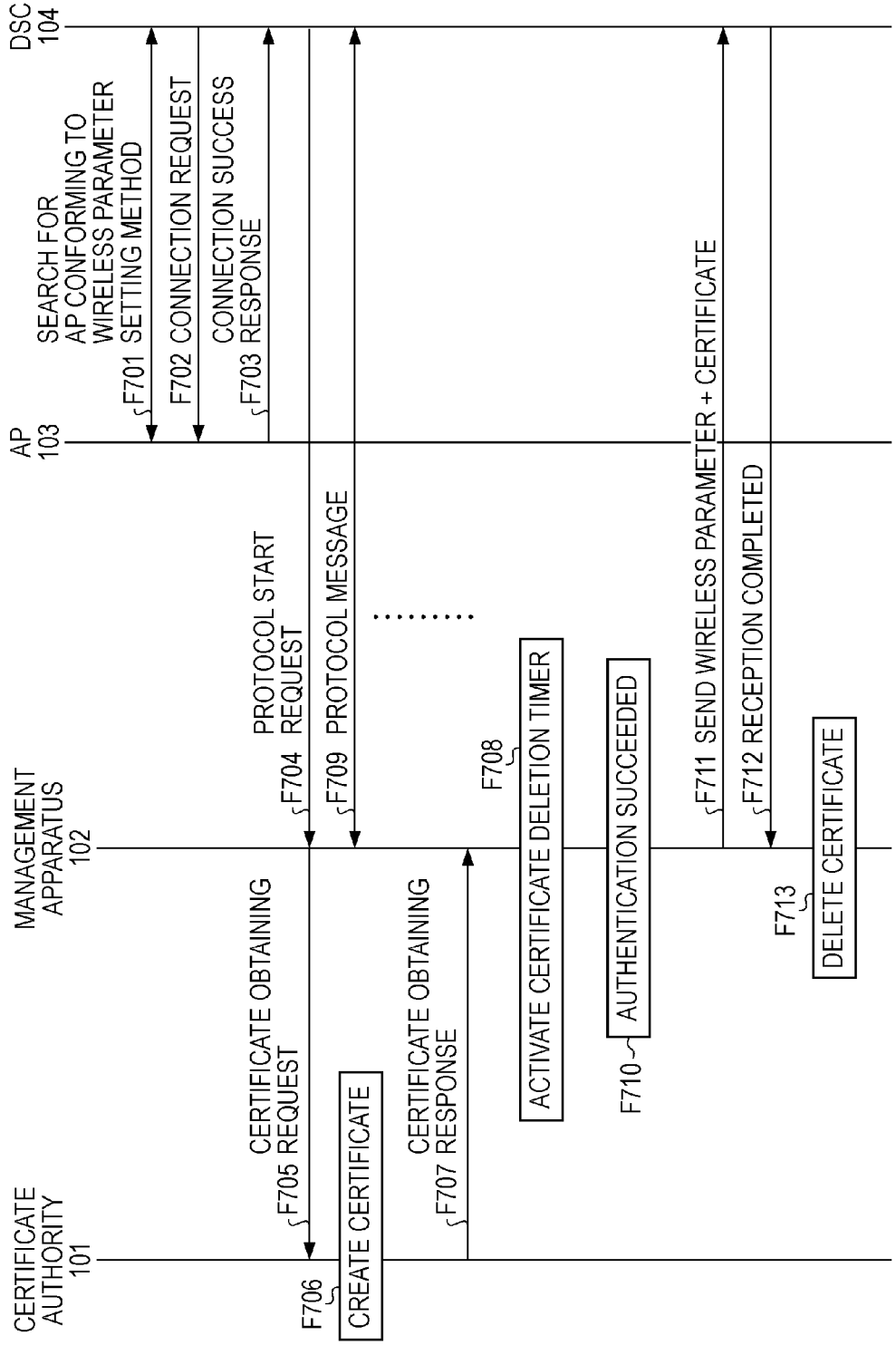
FIG. 7 is a sequence diagram according to the second exemplary embodiment of the present invention.

FIG. 7 illustrates a sequence of the respective apparatuses according to the present embodiment.

When the wireless parameter setting method of the DSC 104 is activated through an operation by the user, etc., the DSC 104 sends a search request to search for an AP conforming to the wireless parameter setting method (F701). When a search response to the search request is received from the AP 103 (F701), the DSC 104 sends a connection request to the AP 103 so that a temporary connection is established with the AP 103 (F702). When the connection request (F702) is sent, an SSID included in the search response (F701) from the AP 103 is used. When the DSC 104 receives a connection success response sent from the AP 103 (F703), the establishment of the temporary wireless connection between the AP 103 and the DSC 104 is completed.

After the establishment of the temporary wireless connection, even when the wireless parameter such as an encryption key is not set in the DSC 104, by using a packet prescribed by the wireless parameter setting method, the DSC 104 can communicate with the management apparatus 102 via the AP 103.

Next, the DSC 104 sends a start request of the wireless parameter setting protocol via the AP 103 to the management apparatus 102 (F704). The management apparatus 102 which has received the start request of the wireless parameter setting protocol (F704) sends a certificate obtaining request to the certificate authority 101 (F705). When the certificate authority 101 receives the certificate obtaining request (F705), the certificate authority 101 creates a certificate (F706) and sends the certificate to the management apparatus 102 as a certificate obtaining response (F707).

The management apparatus 102 extracts a certificate for the client from the received certificate obtaining response (F707) and stores the certificates in the storage unit 210. Then, the management apparatus 102 activates a timer for a certificate deletion processing (F708).

In addition, in parallel with the certificate obtaining processing, the management apparatus 102 performs the message sending and reception with the DSC 104 in accordance with the procedure prescribed by the wireless parameter setting method (F709). The message sent from the DSC 104 includes a password used to determine whether the provision of the wireless parameter to the DSC 104 may be performed. As the management apparatus 102 compares the password stored in the storage unit 210 with the password sent from the DSC 104, the authentication of the DSC 104 is performed (F710). The authentication in this case determines whether the wireless communication apparatus is an apparatus which may be provided with the wireless parameter.

When the authentication succeeds, the management apparatus 102 sends the wireless parameter and the certificate for the client stored in the storage unit 210 to the DSC 104 (F711). In a case where the certificate obtaining is not completed at the time of the authentication success, the management apparatus 102 stands by to perform the sending until the certificate is obtained.

When the wireless parameter and the certificate for the client sent from the management apparatus 102 are received, the DSC 104 sends a reception completion message to the management apparatus 102 (F712). When the management apparatus 102 receives the reception completion message, the management apparatus 102 deletes the certificate for the client from the storage unit 210 (F713).

Figure 6:
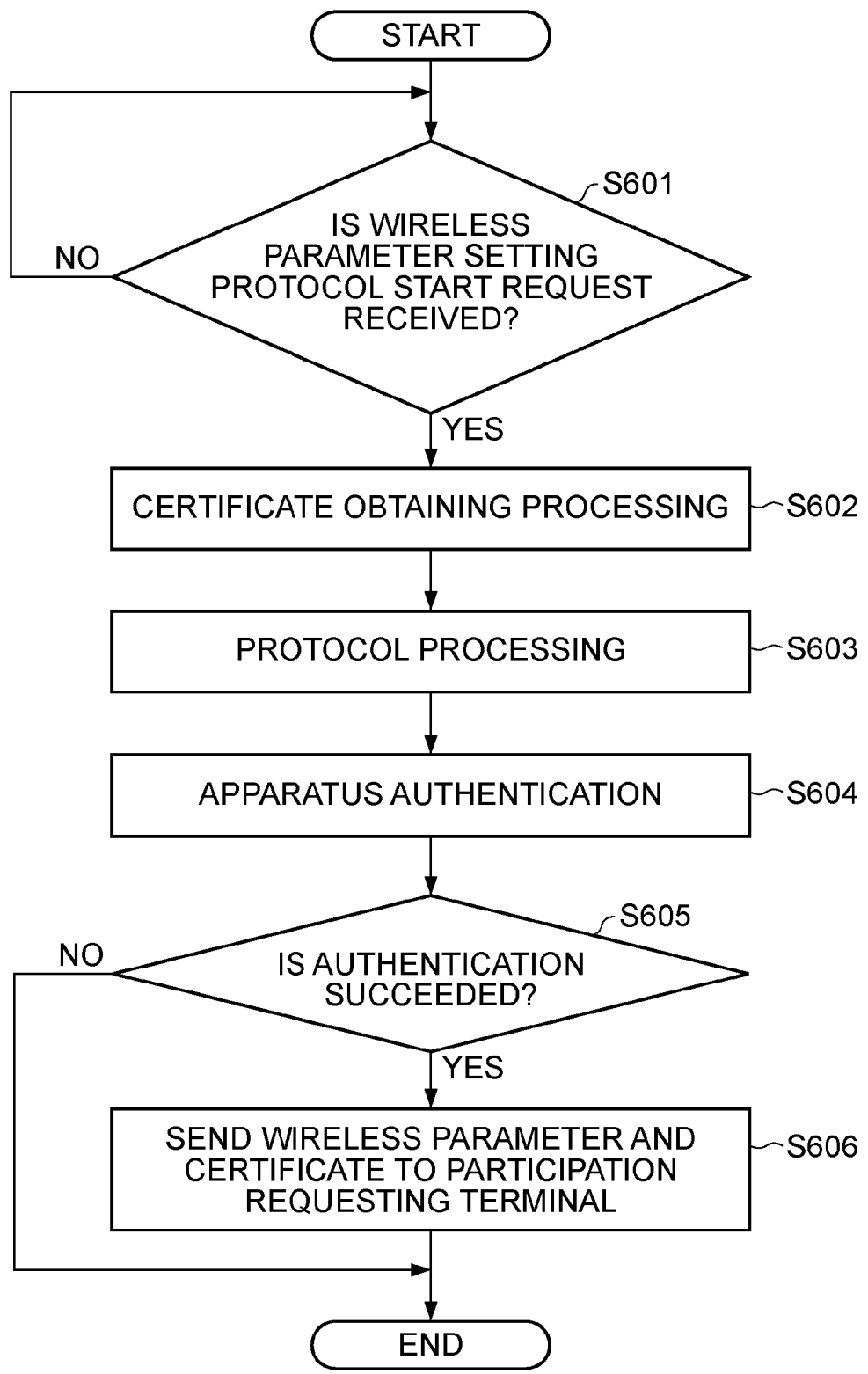
FIG. 6 is an operation flow of the management apparatus according to a second exemplary embodiment of the present invention.

FIG. 6 illustrates an operation flow of the management apparatus 102 according to the present embodiment.

The management apparatus 102 stands by to receive the start request of the wireless parameter setting protocol sent from the wireless communication apparatus (the DSC 104 in the present embodiment) (S601). When the management apparatus 102 receives the start request of the wireless parameter setting protocol (Yes in S601), the management apparatus 102 performs a certificate obtaining processing (S602). To be more specific, the obtaining of the certificate is requested from the management apparatus 102 to the certificate authority 101 and the certificate issued from the certificate authority 101 is obtained. Then, the management apparatus 102 stores the received certificate for the client in the storage unit 210.

Also, the management apparatus 102 performs the message sending and reception (the protocol processing) through the procedure prescribed by the wireless parameter setting method with the wireless communication apparatus that is the request sending source (S603). The processing in S602 and the processing in S603 can be executed in parallel.

Then, the management apparatus 102 compares the password stored in the storage unit 210 with the password obtained through the course of the protocol processing to perform the authentication for the above-described wireless communication apparatus (S604). The authentication in this case determines whether the wireless communication apparatus is an apparatus which may be provided with the wireless parameter.

When the authentication succeeds (Yes in S605), the management apparatus 102 sends the wireless parameter and the certificate for the client stored in the storage unit 210 to the wireless communication apparatus (S606). In a case where the certificate obtaining is not completed at the time of the authentication success, the management apparatus 102 stands by to perform the sending until the certificate is obtained. If the timeout occurs in the wireless parameter setting method while the certificate obtaining is not completed, the management apparatus 102 stops the processing. When the authentication fails (No in S605), the management apparatus 102 ends the processing.

The operation flow in which the management apparatus 102 deletes the certificate for the client is similar to that of the first exemplary embodiment (FIG. 4), and thus a description will be omitted here.

According to the present embodiment, as the timing related to the wireless parameter setting processing based on the wireless parameter setting method, the certificate obtaining processing is performed when the management apparatus 102 receives the start request of the wireless parameter setting protocol from the wireless communication apparatus, and the obtained certificate for the client is sent to the wireless communication apparatus together with the wireless parameter. Therefore, it is possible to reduce the possibility that the setting processing based on the wireless parameter setting method times-out before the certificate is obtained.

Also, it is possible to shorten the time period from the obtaining of the certificate to the sending of the certificate as compared with the case where the certificate is obtained in advance. Therefore, in a case where the expiration date is set in the certificate, a time lag from the certificate issuance from the certificate authority to the certificate obtaining by the wireless communication apparatus can be reduced.

Also, as compared with the case where the management apparatus 102 obtains the certificate in advance, the period of time during which the management apparatus holds the certificate can be shortened. Thus, the possibility that the certificate is stolen by way of an unauthorized access can be decreased.

In addition, as the management apparatus 102 deletes the stored certificate for the client when the reception completion message is received from the wireless communication apparatus, it is possible to further enhance the security. Also, as the certificate for the client is deleted when the timeout occurs in the certificate deletion timer, even if the reception completion message cannot be received, the certificate for the client is not held for longer than a certain period of time and it is possible to still further enhance the security.

Next, a third exemplary embodiment of the present invention will be described. The system configuration and the block configuration of the management apparatus 102 are similar to those of the first exemplary embodiment (FIGS. 1 and 2) and a description thereof will be omitted.

Figure 9:
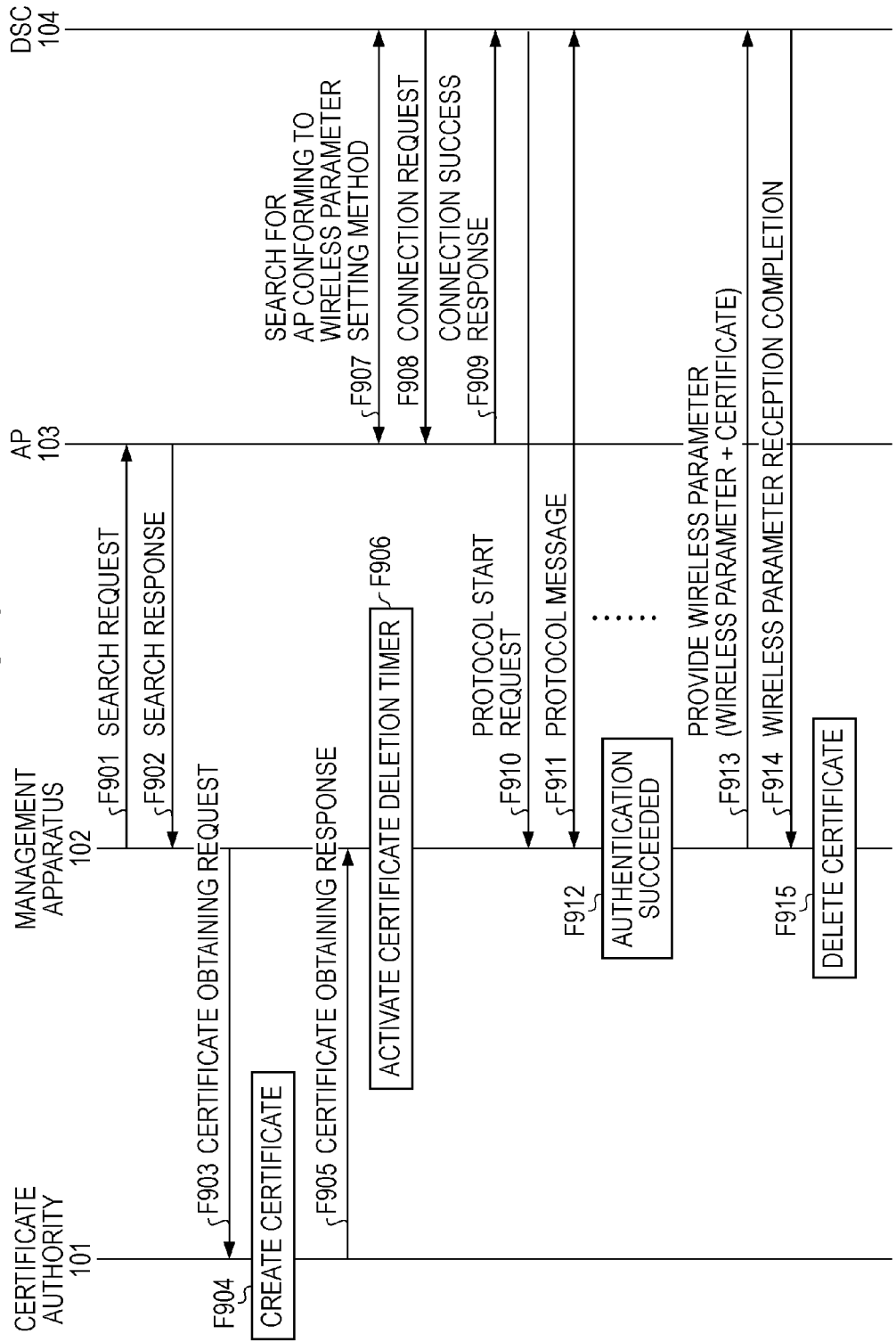
FIG. 9 is a sequence diagram according to the third exemplary embodiment of the present invention.

FIG. 9 illustrates a sequence of the respective apparatuses according to the present embodiment.

The management apparatus 102 sends a search request to search for an AP 103 where the wireless parameter setting method is activated to the wired LAN (F901). The management apparatus 102 periodically sends the search request until a search response from the AP 103 is received. The search request may be sent in any method of broadcast, multicast, and unicast. Herein the broadcast means that a message is sent to an unspecified number of parties. The multicast means that the same message is sent to a plurality of specified parties. The unicast means that a message is sent to a one specified party.

When the AP 103 receives the search request, if the wireless parameter setting method is activated, the AP 103 sends the search response to the management apparatus 102 (F902). Herein, the AP 103 where the wireless parameter setting method is activated does not merely refer to an AP conforming to the wireless parameter setting method but refers to an AP in a state where the setting processing based on the wireless parameter setting method can be executed through the operation by the user or the like. Therefore, even in the case of the AP 103 conforming to the wireless parameter setting method, when the wireless parameter setting method is set in the activation OFF state, the AP 103 does not send the search response in a busy state while another processing is executed, for example.

When the search response (F902) is received, the management apparatus 102 sends a certificate obtaining request to the certificate authority 101 (F903). When the certificate authority 101 receives the certificate obtaining request (F903), the certificate authority 101 creates a certificate (F904) and sends the certificate to the management apparatus 102 as a certificate obtaining response (F905).

The management apparatus 102 extracts a certificate for the client from the received certificate obtaining response (F905) and stores the certificates in the storage unit 210. Then, the management apparatus 102 activates a timer for a certificate deletion processing (F906).

When the wireless parameter setting method of the DSC 104 is activated through an operation by the user, etc., the DSC 104 sends a search request to search for an AP conforming to the wireless parameter setting method (F907). When a search response to the search request is received from the AP 103 (F907), the DSC 104 sends a connection request to the AP 103 so that a temporary connection is established with the AP 103 (F908). When the connection request (F908) is sent, an SSID included in the search response (F907) from the AP 103 is used. When the DSC 104 receives a connection success response sent from the AP 103 (F909), the establishment of the temporary wireless connection between the AP 103 and the DSC 104 is completed.

After the establishment of the temporary wireless connection, even when the wireless parameter such as an encryption key is not set in the DSC 104, by using a packet prescribed by the wireless parameter setting method, the DSC 104 can communicate with the management apparatus 102 via the AP 103.

Next, the DSC 104 sends a start request of the wireless parameter setting protocol via the AP 103 to the management apparatus 102 (F910). The management apparatus 102 which has received the start request of the wireless parameter setting protocol (F910) performs message sending and reception based on a procedure prescribed by the wireless parameter setting method with respect to the DSC 104 (F911). The message sent from the DSC 104 includes a password used to determine whether the provision of the wireless parameter to the DSC 104 may be performed. As the management apparatus 102 compares the password stored in the storage unit 210 with the password sent from the DSC 104, the authentication of the DSC 104 is performed (F912). The authentication in this case determines whether the wireless communication apparatus is an apparatus which may be provided with the wireless parameter.

When the authentication succeeds, the management apparatus 102 sends the wireless parameter and the certificate for the client stored in the storage unit 210 to the DSC 104 (F913). When the wireless parameter and the certificate for the client sent from the management apparatus 102 are received, the DSC 104 sends a reception completion message to the management apparatus 102 (F914). When the management apparatus 102 receives the reception completion message, the management apparatus 102 deletes the certificate for the client from the storage unit 210 (F915).

Figure 8:
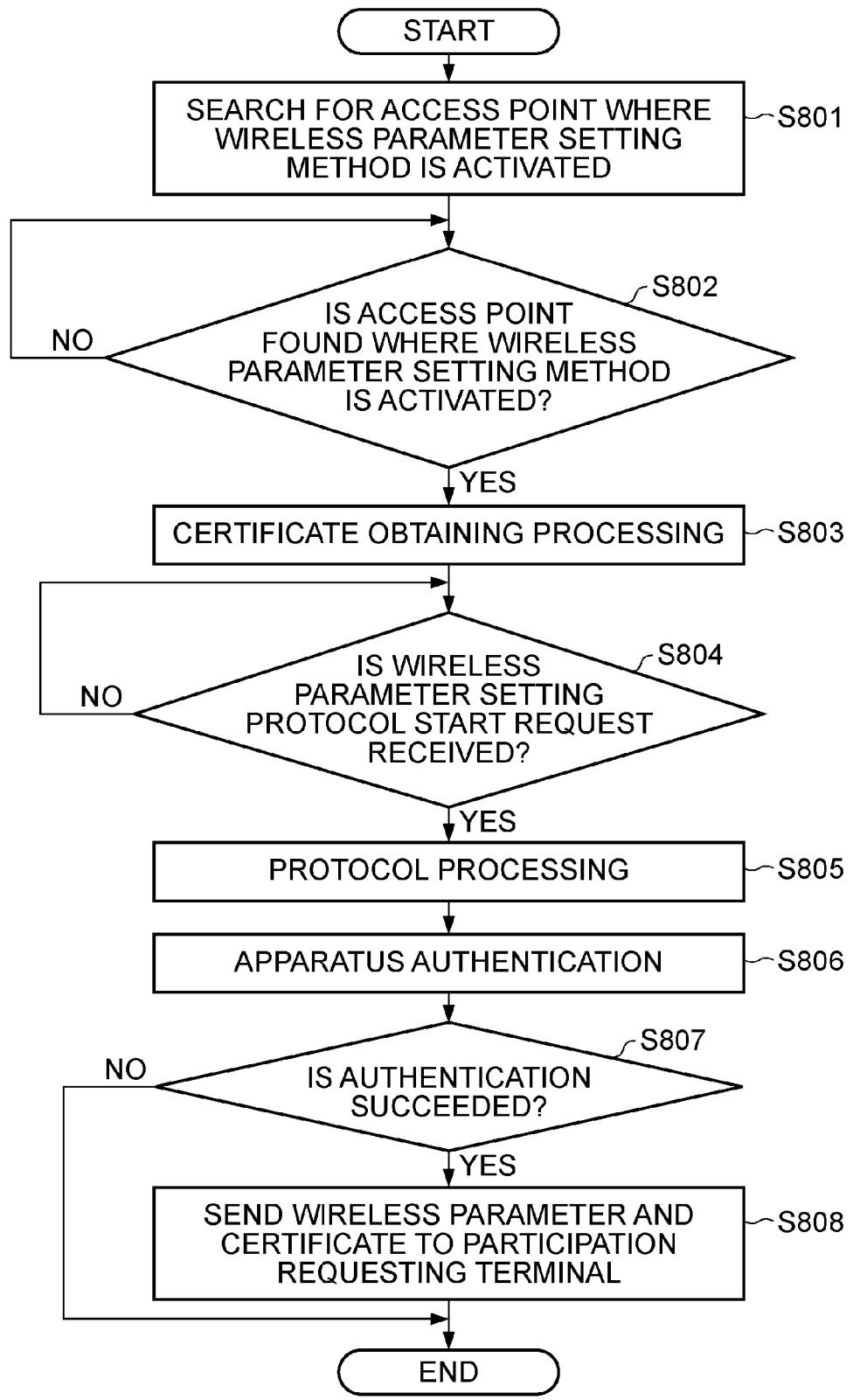
FIG. 8 is an operation flow of the management apparatus according to a third exemplary embodiment of the present invention.

FIG. 8 illustrates an operation flow of the management apparatus 102 according to the present embodiment.

The management apparatus 102 searches for an AP where the wireless parameter setting method is activated (S801). The search can be realized by using a Discovery function of UPnP (Universal Plug and Play) but the search method is not limited to the above.

When the AP where the wireless parameter setting method is found (Yes in S802), the management apparatus 102 performs a certificate obtaining processing (S803). To be more specific, the obtaining of the certificate is requested from the management apparatus 102 to the certificate authority 101 and the certificate issued from the certificate authority 101 is obtained. Then, the management apparatus 102 stores the received certificate for the client in the storage unit 210.

Next, the management apparatus 102 stands by to receive a start request of the wireless parameter setting protocol sent from the wireless communication apparatus (the DSC 104 according to the present embodiment) (S804). When the management apparatus 102 receives the start request of the wireless parameter setting protocol (Yes in S804), the management apparatus 102 performs the message sending and reception (the protocol processing) through the procedure prescribed by the wireless parameter setting method with the wireless communication apparatus that is the request sending source (S805).

Then, the management apparatus 102 compares the password stored in the storage unit 210 with the password obtained through the course of the protocol processing to perform the authentication for the above-described wireless communication apparatus (S806). The authentication in this case determines whether the wireless communication apparatus is an apparatus which may be provided with the wireless parameter.

When the authentication succeeds (Yes in S807), the management apparatus 102 sends the wireless parameter and the certificate for the client stored in the storage unit 210 to the wireless communication apparatus (S808). When the authentication fails (No in S807), the management apparatus 102 ends the processing.

The operation flow in which the management apparatus 102 deletes the certificate for the client is similar to that of the first exemplary embodiment (FIG. 4), and thus a description will be omitted here.

According to the present embodiment, as the timing related to the wireless parameter setting processing based on the wireless parameter setting method, the certificate obtaining processing is performed when the management apparatus 102 finds out the AP is in a state where the setting processing based on the wireless parameter setting method can be executed, and the obtained certificate for the client is sent to the wireless communication apparatus together with the wireless parameter. Therefore, as compared with the first and second exemplary embodiments, the probability that the setting processing timeout based on the wireless parameter setting method is generated before the certificate is obtained can be reduced.

Also, it is possible to shorten the time period from the obtaining of the certificate to the sending of the certificate as compared with the case where the certificate is obtained in advance. Therefore, in a case where the expiration date is set in the certificate, a time lag from the certificate issuance from the certificate authority to the certificate obtaining by the wireless communication apparatus can be reduced.

Also, as compared with the case where the management apparatus 102 obtains the certificate in advance, the period of time during which the management apparatus 102 holds the certificate can be shortened. Thus, the possibility that the certificate is stolen by way of an unauthorized access can be further decreased. In addition, as the management apparatus 102 deletes the stored certificate for the client when the reception completion message is received from the wireless communication apparatus, it is possible to further enhance the security. Also, as the certificate for the client is deleted when the timeout occurs in the certificate deletion timer, even if the reception completion message cannot be received, the certificate for the client is not held for longer than a certain period of time and it is possible to still further enhance the security.

According to the first to third exemplary embodiments, timings at which the management apparatus 102 requests the certificate authority for the certificate obtaining are different. As described above, in a case where a long period of time is required for the certificate obtaining, the setting processing based on the wireless parameter setting method may be timed out in mid-course.

According to the present embodiment, a description will be provided of an example in which timings for sending the certificate obtaining request are switched in accordance with a time period required for the certificate obtaining processing by the management apparatus 102. The system configuration and the block configuration of the management apparatus 102 are similar to those of the first exemplary embodiment (FIGS. 1 and 2), thus, a description will be omitted.

The management apparatus 102 according to the present embodiment can switch and execute the methods according to the above-described first to third exemplary embodiments (hereinafter referred to as obtaining methods 1 to 3). Also, regardless of the timing related to the wireless parameter setting processing based on the wireless parameter setting method, the management apparatus 102 can obtain the certificate from the certificate authority 101 in advance (hereinafter referred to as obtaining method 4).

A required period of time from the obtaining of the certificate by the management apparatus 102 to the sending of the obtained certificate for the client to the wireless communication apparatus has a relation of the obtaining method 1<the obtaining method 2<the obtaining method 3<the obtaining method 4. In the obtaining methods 1 to 3, thresholds T (T1 to T3) are set. For example, in a case where the required period of time for the management apparatus to obtain the certificate exceeds T1, if the obtaining method 1 is used, a probability that the setting processing based on the wireless parameter setting method is timed out is increased.

Figure 10:
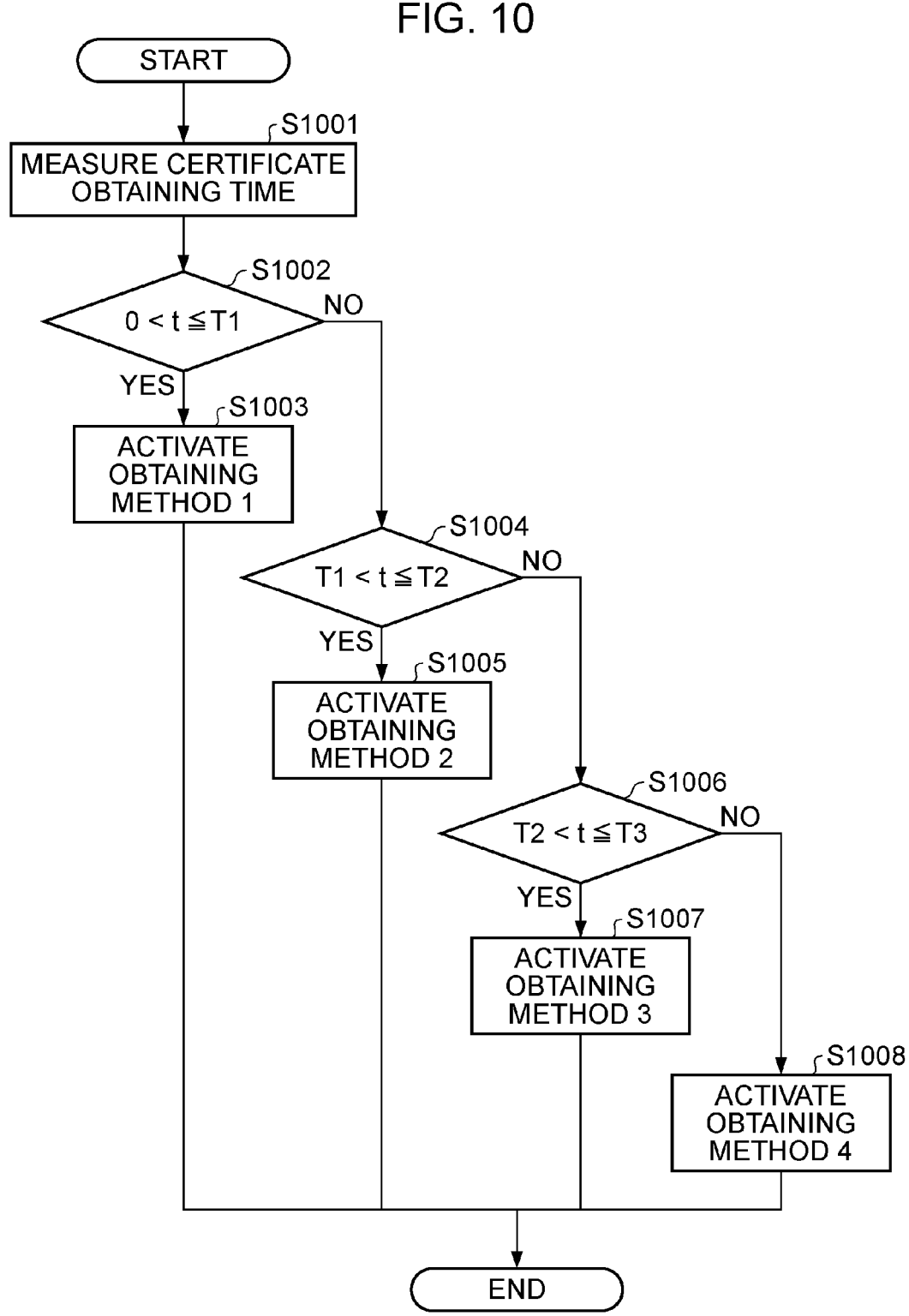
FIG. 10 is an operation flow related to an obtaining method selection processing according to a fourth exemplary embodiment of the present invention.

FIG. 10 illustrates an operation flow when the management apparatus 102 selects to use any obtaining method from the obtaining methods 1 to 4.

First, the management apparatus 102 measures a period of time from the sending of the certificate obtaining request to the certificate authority 101 to the reception of the certificate issued from the certificate authority 101 (certificate obtaining time) t (S1001). Herein, the management apparatus 102 may perform the certificate obtaining processing for a plurality of times to set this average as "t". It is noted that the certificate obtained for measuring the certificate obtaining time t is not used for the authentication processing of the wireless communication apparatus. For example, after the measurement completion of the certificate obtaining time t, the obtained certificate may be deleted.

When the certificate obtaining time t has a relation of 0<t≦T1 (Yes in S1002), the management apparatus 102 selects the obtaining method 1 (S1003).

When the certificate obtaining time t has a relation of T1<t≦T2 (Yes in S1004), the management apparatus 102 selects the obtaining method 2 (S1005).

When the certificate obtaining time t has a relation of T2<t≦T3 (Yes in S1006), the management apparatus 102 selects the obtaining method 3 (S1007).

When the certificate obtaining time t has a relation of T3<t (No in S1006), the management apparatus 102 selects the obtaining method 4 (S1008).

According to the present embodiment, the management apparatus switches and executes the plurality of obtaining methods in accordance with the required period of time for obtaining the certificate. Thus, even when the required period of time for obtaining the certificate varies due to a change in communication environment or a difference in apparatus performance, such a situation can be adaptively coped with.

Therefore, while the management apparatus shortens the period of time to hold the certificate, it is possible to reduce the probability that the setting processing timeout based on the wireless parameter setting method occurs.

According to the above-described embodiments, the management apparatus 102 obtains the certificate from the certificate authority by using the timing related to the setting processing based on the wireless parameter setting method as a trigger, and sends the obtained certificate for the client together with the wireless parameter to the wireless communication apparatus. Therefore, the certificate is not obtained when it is unnecessary to provide the certificate for the client to the wireless communication apparatus, and thus unnecessary communication communications traffic can be reduced. It is also possible to decrease the load on the certificate authority and the management apparatus.

With respect to the timing related to the wireless parameter setting processing based on the wireless parameter setting method, a description has been provided of the examples of the password authentication based on the wireless parameter setting method, reception of the start request of the wireless parameter setting protocol from the wireless communication apparatus, and the founding of the AP in a state where the setting processing based on the wireless parameter setting method can be executed. However, the timing related to the setting processing based on the wireless parameter setting method is not limited to the above example(s).

According to the above-described embodiments, the case of using the DSC 104 as the wireless communication apparatus has been described, but the wireless communication apparatus may be any apparatus such as a printer, a personal computer, a portable music player, etc..

According to the above-described embodiments, the case of using an IEEE 802.11 wireless LAN has been described, but the present invention can be applied to other wireless communication methods such as UWB and WiMax. Also, the present invention can be applied not only to wireless communication, but also to a case of setting a parameter for a wired communication.

Embodiments of the present invention can be achieved by supplying various apparatuses constituting a system with an a recording medium on which a software program code for realizing the function of the above-described embodiments is recorded and reading and executing the program code stored on the recording medium by a computer (or a CPU or an MPU) which governs the control on the system or the apparatuses. In this case, the program code itself read out from the storage medium realizes the functions of the above-described embodiments, and the storage medium on which the program code is stored constitutes the present invention.

For the storage medium for supplying the program code, for example, a floppy disk, a hard disk drive, an optical disk, an opto-magnetic disk, a CD-ROM, a CD-R, a magnet tape, a non-volatile memory card, a ROM, a DVD, etc. may be used.

In addition, the present invention includes not only a case where the program code read out by the computer is executed to realize the functions of the above-described embodiments, but also a case where a part or all of the actual processing is performed by an operation system (OS) running on the computer in accordance with an instruction of the program code and the processing realizes the functions of the above-described embodiments.

Furthermore, the present invention includes a case where the program code read out from the storage medium is written in a memory that is provided to a function expansion board inserted in the computer or a function expansion unit connected to the computer, and then a CPU or the like provided to the function expansion board or the function expansion unit performs a part or all of the actual processing in accordance with an instruction of the program code to realize the functions of the above-described embodiments by the processing.

In this manner, according to the above-described embodiments, it is possible to obtain a certificate from a certificate authority by using the timing related to the setting processing based on the wireless parameter setting method as a trigger and send the obtained certificate together with the wireless parameter to the communication apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-343054 filed Dec. 20, 2006 and Japanese Application No. 2007-266606 filed Oct. 12, 2007 which are hereby incorporated by reference herein in their entirety.

What is claimed is:

1. A management apparatus for providing a wireless parameter to a wireless communication apparatus based on a wireless parameter setting method, the management apparatus comprising:
    a detecting unit configured to detect a timing related to a wireless parameter setting processing by the method;
    an obtaining unit configured to obtain a certificate for authenticating whether the wireless communication apparatus is a valid terminal, from a certificate authority which issues the certificate, in response to the detected timing;
    a provision unit configured to provide the wireless parameter and the obtained certificate to the wireless communication apparatus in case that the wireless parameter is provided to the wireless communication apparatus based on the method;
    an activation unit configured to activate a timer for measuring a time period to delete the certificate, wherein the certificate is deleted when the timer period expires;
    a timer unit configured to measure a time period required for obtaining the certificate; and
    a selection unit configured to select a timing functioning as trigger for obtaining the certificate from among a plurality of timings related to the wireless parameter setting processing based on the wireless parameter setting method in accordance with the measured time period.

2. The management apparatus according to claim 1, wherein the timing is a timing at which the wireless communication apparatus is permitted to be provided with the wireless parameter.

3. The management apparatus according to claim 1, wherein the timing is a timing at which a start request of the wireless parameter setting processing based on the wireless parameter setting method is received.

4. The management apparatus according to claim 1, wherein the timing is a timing at which an access point in a state where the wireless parameter setting processing based on the wireless parameter setting method can be executed is found.

5. The management apparatus according to claim 1, further comprising a reception unit configured to receive a certificate reception completion message from the wireless communication apparatus, wherein the certificate is deleted in accordance with reception of the certificate reception completion message.

6. A method for a management apparatus configured to provide a wireless parameter to a wireless communication apparatus based on a wireless parameter setting method, the method comprising:

detecting a timing related to a wireless parameter setting processing by the wireless parameter setting method obtaining a certificate for authenticating whether the wireless communication apparatus is a valid terminal, from the certificate authority, in response to the detected timing;

providing the wireless parameter and the certificate to the wireless communication apparatus in case that the wireless parameter is provided to the wireless communication apparatus based on the wireless parameter setting method;

activating a timer for measuring a time period to delete the certificate, wherein the certificate is deleted when the timer period expires;

measuring a time period required for obtaining the certificate; and selecting a timing functioning as a trigger for obtaining the certificate from among a plurality of timings related to the wireless parameter setting processing based on the wireless parameter setting method in accordance with the measured time period.

7. The method according to claim 6, wherein the timing is a timing at which the wireless communication apparatus is permitted to be provided with the wireless parameter.

8. The method according to claim 6, wherein the timing is a timing at which a start request of the wireless parameter setting processing based on the wireless parameter setting method is received.

9. The method according to claim 6, wherein the timing is a timing at which an access point in a state where the wireless parameter setting processing based on the wireless parameter setting method can be executed is found.

10. The method according to claim 6, further comprising receiving a certificate reception completion message from the wireless communication apparatus, wherein the certificate is deleted in accordance with reception of the certificate reception completion message.

11. A non-transitory computer-readable storage medium storing computer-executable process steps, the computer-executable process steps causing a computer to execute the method comprising:

detecting a timing related to a wireless parameter setting processing by the wireless parameter setting method;

obtaining a certificate for authenticating whether the wireless communication apparatus is a valid terminal, from the certificate authority, in response to the detected timing;

providing the wireless parameter and the certificate to the wireless communication apparatus in case that the wireless parameter is provided to the wireless communication apparatus based on the wireless parameter setting method;

activating a timer for measuring a time period to delete the certificate, wherein the certificate is deleted when the timer period expires;

measuring a time period required for obtaining the certificate; and selecting a timing functioning as a trigger for obtaining the certificate from among a plurality of timings related to the wireless parameter setting processing based on the wireless parameter setting method in accordance with the measured time period.

12. The non-transitory computer-readable storage medium according to claim 11, wherein the timing is a timing at which the wireless communication apparatus is permitted to be provided with the wireless parameter.

13. The non-transitory computer-readable storage medium according to claim 11, wherein the timing is a timing at which a start request of the wireless parameter setting processing based on the wireless parameter setting method is received.

14. The non-transitory computer-readable storage medium according to claim 11, wherein the timing is a timing at which an access point in a state where the wireless parameter setting processing based on the wireless parameter setting method can be executed is found.

15. The non-transitory computer-readable storage medium according to claim 11, further comprising receiving a certificate reception completion message from the wireless communication apparatus, wherein the certificate is deleted in accordance with reception of the certificate reception completion message.

16. The management apparatus according to claim 1, further comprising:

an authentication unit configured to authenticate whether the wireless communication apparatus is an apparatus which is provided with the wireless parameter, wherein the provision unit provides the wireless parameter and the obtained certificate to the wireless communication apparatus according to an authentication result by the authentication unit.

17. The management apparatus according to claim 1, wherein the wireless parameter comprises a parameter for communicating in the IEEE 802.11 wireless LAN.

18. The management apparatus according to claim 1, wherein the wireless parameter comprises at least one of a network identifier, an encryption method, an encryption key, an authentication method, and an authentication key.

19. The management apparatus according to claim 1, wherein the wireless parameter comprises a network identifier, an encryption method, an encryption key, an authentication method, and an authentication key.

20. The method according to claim 6, wherein the wireless parameter comprises a parameter for communicating in the IEEE 802.11 wireless LAN.

21. The method according to claim 6, wherein the wireless parameter comprises at least one of a network identifier, an encryption method, an encryption key, an authentication method, and an authentication key.

22. The method according to claim 6, wherein the wireless parameter comprises a network identifier, an encryption method, an encryption key, an authentication method, and an authentication key.

* * * * *